US012579479B2

(12) United States Patent
Sharpe et al.

(10) Patent No.: US 12,579,479 B2
(45) Date of Patent: Mar. 17, 2026

(54) COUNTERFACTUAL SAMPLES FOR MAINTAINING CONSISTENCY BETWEEN MACHINE LEARNING MODELS

(71) Applicant: Capital One Services, LLC, McLean, VA (US)

(72) Inventors: Samuel Sharpe, Cambridge, MA (US); Christopher Bayan Bruss, Washington, DC (US); Brian Barr, Schenectady, NY (US)

(73) Assignee: Capital One Services, LLC, McLean, VA (US)

( * ) Notice: Subject to any disclaimer, the term of this patent is extended or adjusted under 35 U.S.C. 154(b) by 827 days.

(21) Appl. No.: 17/937,356

(22) Filed: Sep. 30, 2022

(65) Prior Publication Data

US 2024/0112092 A1 Apr. 4, 2024

(51) Int. Cl.
*G06N 20/20* (2019.01)
*G06N 3/045* (2023.01)
(Continued)

(52) U.S. Cl.
CPC ............. *G06N 20/20* (2019.01); *G06N 3/045* (2023.01); *G06N 3/08* (2013.01); *G06N 5/045* (2013.01);
(Continued)

(58) Field of Classification Search
CPC ........ G06N 20/20; G06N 5/045; G06N 3/045; G06N 3/08; G06Q 30/0631; G06Q 40/03; G06Q 10/06375
See application file for complete search history.

(56) References Cited

U.S. PATENT DOCUMENTS 10,861,028 B2 * 12/2020 Silberman ......... G06F 18/24155
11,403,538 B1 * 8/2022 Verma .................... G06N 20/00
(Continued)

FOREIGN PATENT DOCUMENTS

GB          2589828 A * 6/2021 ............... G06N 7/01
WO      WO-2022016556 A1 * 1/2022 ......... G06F 16/9035

OTHER PUBLICATIONS

Alaa, Ahmed M., Michael Weisz, and Mihaela Van Der Schaar. "Deep counterfactual networks with propensity-dropout." arXiv preprint arXiv: 1706.05966 (2017). (Year: 2017).*
(Continued)

*Primary Examiner* — Andrew L Tank
(74) *Attorney, Agent, or Firm* — Foley & Lardner LLP

(57) ABSTRACT

In some aspects, a computing system may aggregating multiple counterfactual samples so that machine learning explanations can be generated for sub-populations. In addition, methods and systems described herein use machine learning and counterfactual samples to determine text to use in an explanation for a model's prediction. A computing system may also train machine learning models to not only determine whether a request to perform an action should be accepted, but also to generate output that is consistent with output generated by previous machine learning models. Further, a computing system may generate counterfactual samples based on user preferences. A computing system may obtain preferences and then apply a penalty or adjustment parameter such that when a counterfactual sample is created, the computing system is forced to change one or more features indicated by the preferences to create the counterfactual sample.

19 Claims, 6 Drawing Sheets

(51) Int. Cl.
G06N 3/08 (2023.01)
G06N 5/045 (2023.01)
G06Q 40/03 (2023.01)
*G06Q 30/0601* (2023.01)

(52) U.S. Cl.
CPC ......... *G06Q 30/0631* (2013.01); *G06Q 40/03*
(2023.01)

(56) References Cited

U.S. PATENT DOCUMENTS

| | | | | |
|---|---|---|---|---|
| 11,762,950 | B1 * | 9/2023 | Stupp | G06F 18/22 |
| | | | | 706/12 |
| 11,922,495 | B1 * | 3/2024 | Hernandez | G06Q 40/03 |
| 12,254,388 | B2 * | 3/2025 | McGrath | G06N 5/045 |
| 12,333,775 | B2 * | 6/2025 | Alon | G06V 10/255 |
| 2020/0097997 | A1 * | 3/2020 | Li | G06N 20/00 |
| 2020/0279140 | A1 * | 9/2020 | Pai | G06F 11/3447 |
| 2020/0380571 | A1 * | 12/2020 | Ramakrishnan | |
| | | | | G06Q 10/06375 |
| 2021/0089895 | A1 * | 3/2021 | Munoz Delgado | G06N 3/043 |
| 2021/0201184 | A1 * | 7/2021 | Scheepens | G06F 18/217 |
| 2021/0287273 | A1 * | 9/2021 | Janakiraman | G06Q 30/0623 |
| 2021/0326661 | A1 * | 10/2021 | Munoz Delgado | G06N 3/0455 |
| 2022/0012613 | A1 * | 1/2022 | Datta | G06N 20/20 |
| 2022/0083871 | A1 * | 3/2022 | Nemirovsky | G06N 3/088 |
| 2022/0114399 | A1 * | 4/2022 | Castiglione | G06V 10/751 |
| 2022/0114464 | A1 * | 4/2022 | Yang | G06N 7/01 |
| 2022/0130143 | A1 * | 4/2022 | Rodriguez Lopez | G06V 10/82 |
| 2022/0147876 | A1 * | 5/2022 | Dalli | G06N 20/00 |
| 2022/0188645 | A1 * | 6/2022 | Nia | G06N 3/045 |
| 2022/0198498 | A1 * | 6/2022 | Huang | G06Q 20/387 |
| 2022/0207352 | A1 * | 6/2022 | Barr | G06F 17/18 |
| 2022/0207353 | A1 * | 6/2022 | Barr | G06N 3/08 |
| 2022/0253721 | A1 * | 8/2022 | Xu | G06N 3/088 |
| 2022/0253733 | A1 * | 8/2022 | Zuo | G06F 18/214 |
| 2022/0318639 | A1 * | 10/2022 | Upadhyay | G06N 3/047 |
| 2022/0358594 | A1 * | 11/2022 | Zhu | G06N 3/045 |
| 2022/0374782 | A1 * | 11/2022 | Spooner | G06N 20/20 |
| 2022/0398460 | A1 * | 12/2022 | Dalli | G06N 3/126 |
| 2023/0025731 | A1 * | 1/2023 | Vinov | G06N 5/045 |
| 2023/0045950 | A1 * | 2/2023 | Gao | G06N 20/00 |
| 2023/0080235 | A1 * | 3/2023 | Gil Ramos | G06N 3/045 |
| | | | | 706/12 |
| 2023/0214695 | A1 * | 7/2023 | Wu | G06N 3/045 |
| | | | | 706/46 |

OTHER PUBLICATIONS

Neal, Lawrence, et al. "Open set learning with counterfactual images." Proceedings of the European conference on computer vision (ECCV). 2018. (Year: 2018).*

White, Adam, and Artur d'Avila Garcez. "Measurable counterfactual local explanations for any classifier." arXiv preprint arXiv: 1908. 03020v2 (2019). (Year: 2019).*

Hamon, Ronan, Henrik Junklewitz, and Ignacio Sanchez. "Robustness and explainability of artificial intelligence." Publications Office of the European Union 207.40 (2020). (Year: 2020).*

Mahajan, Divyat, Chenhao Tan, and Amit Sharma. "Preserving causal constraints in counterfactual explanations for machine learning classifiers." arXiv preprint arXiv:1912.03277v3 (2020). (Year: 2020).*

Wexler, James, et al. "The what-if tool: Interactive probing of machine learning models." IEEE transactions on visualization and computer graphics 26.1 (2019): 56-65 (Year: 2019).*

Poyiadzi, Rafael, et al. "FACE: feasible and actionable counterfactual explanations." Proceedings of the AAAI/ACM Conference on AI, Ethics, and Society. 2020. (Year: 2020).*

Van Looveren, Arnaud, and Janis Klaise. "Interpretable counterfactual explanations guided by prototypes." Joint European Conference on Machine Learning and Knowledge Discovery in Databases. Cham: Springer International Publishing, 2021. (Year: 2021).* de Oliveira, Raphael Mazzine Barbosa, and David Martens. "A framework and benchmarking study for counterfactual generating methods on tabular data." Applied Sciences 11.16 (2021): 7274. (Year: 2021).*

Rasouli, Peyman, and Ingrid Chieh Yu. "Analyzing and improving the robustness of tabular classifiers using counterfactual explanations." 2021 20th IEEE International Conference on Machine Learning and Applications (ICMLA). IEEE, 2021. (Year: 2021).*

Sujatha, C. N., et al. "Loan prediction using machine learning and its deployement on web application." 2021 Innovations in Power and Advanced Computing Technologies (i-PACT). IEEE, 2021. (Year: 2021).*

Tan, Juntao, et al. "Counterfactual Explainable Recommendation." arXiv preprint arXiv:2108.10539v1 (2021). (Year: 2021).*

Pham, David, and Yongfeng Zhang. "Counterfactual based reinforcement learning for graph neural networks." Annals of Operations Research (2022): 1-17. (Year: 2022).*

Yang, Fan, et al. "Generative counterfactuals for neural networks via attribute-informed perturbation." ACM SIGKDD Explorations Newsletter 23.1 (2021): 59-68. (Year: 2021).*

* cited by examiner

100

| | | | | | | | |
|---|---|---|---|---|---|---|---|
| V1 | V2 | V3 | V4 | V5 | V6 | V7 | Classification |
| 1.0 | -0.96 | -0.18 | 1.79 | -0.86 | -0.01 | 123.50 | 0 |

| | | | | | | | |
|---|---|---|---|---|---|---|---|
| V1 | V2 | V3 | V4 | V5 | V6 | V7 | Classification |
| 1.0 | -0.96 | -0.18 | 1.79 | -0.91 | -0.3 | 123.50 | 1 |

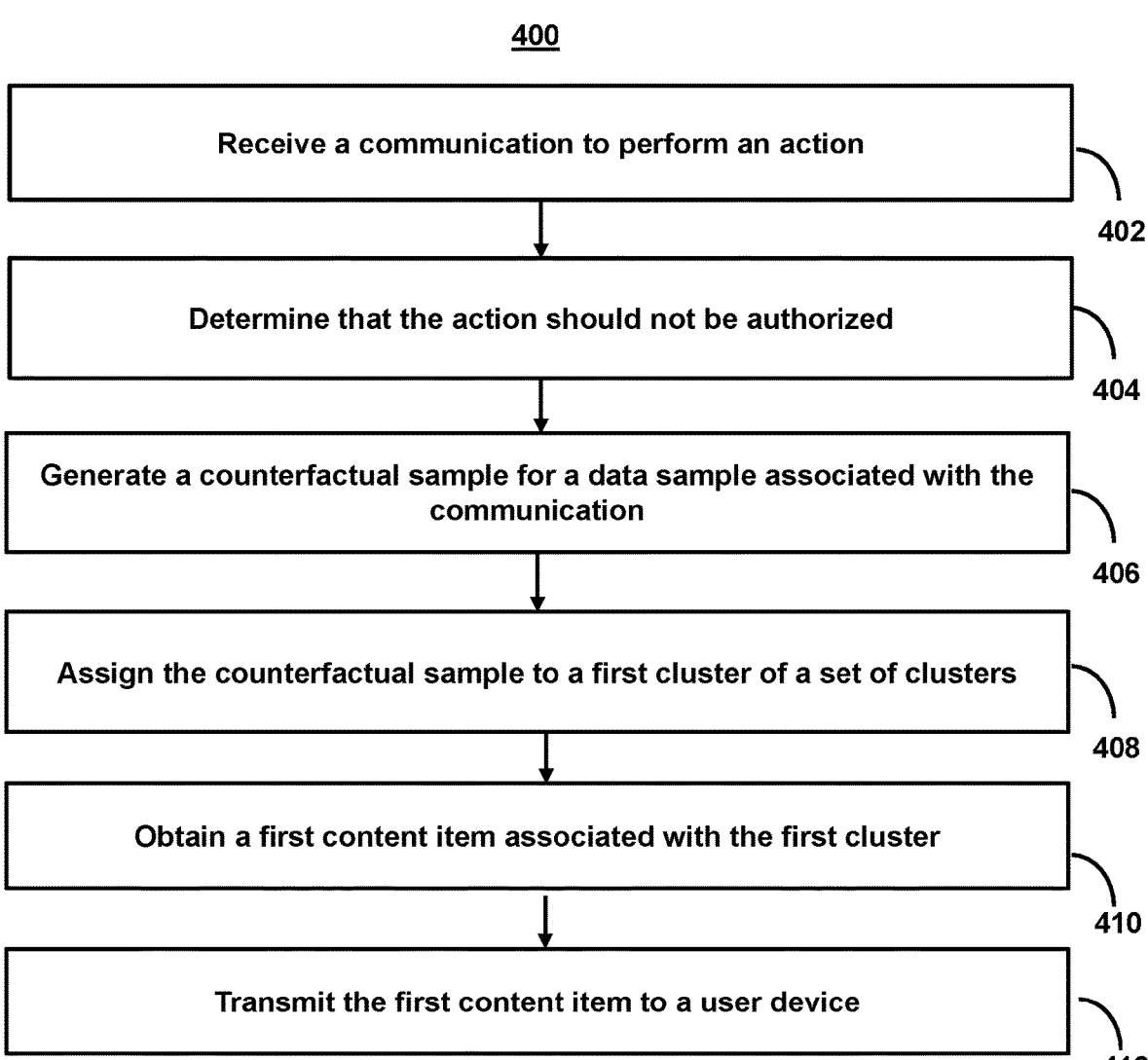

400

Receive a communication to perform an action

402

Determine that the action should not be authorized

404

Generate a counterfactual sample for a data sample associated with the communication

406

Assign the counterfactual sample to a first cluster of a set of clusters

408

Obtain a first content item associated with the first cluster

410

Transmit the first content item to a user device

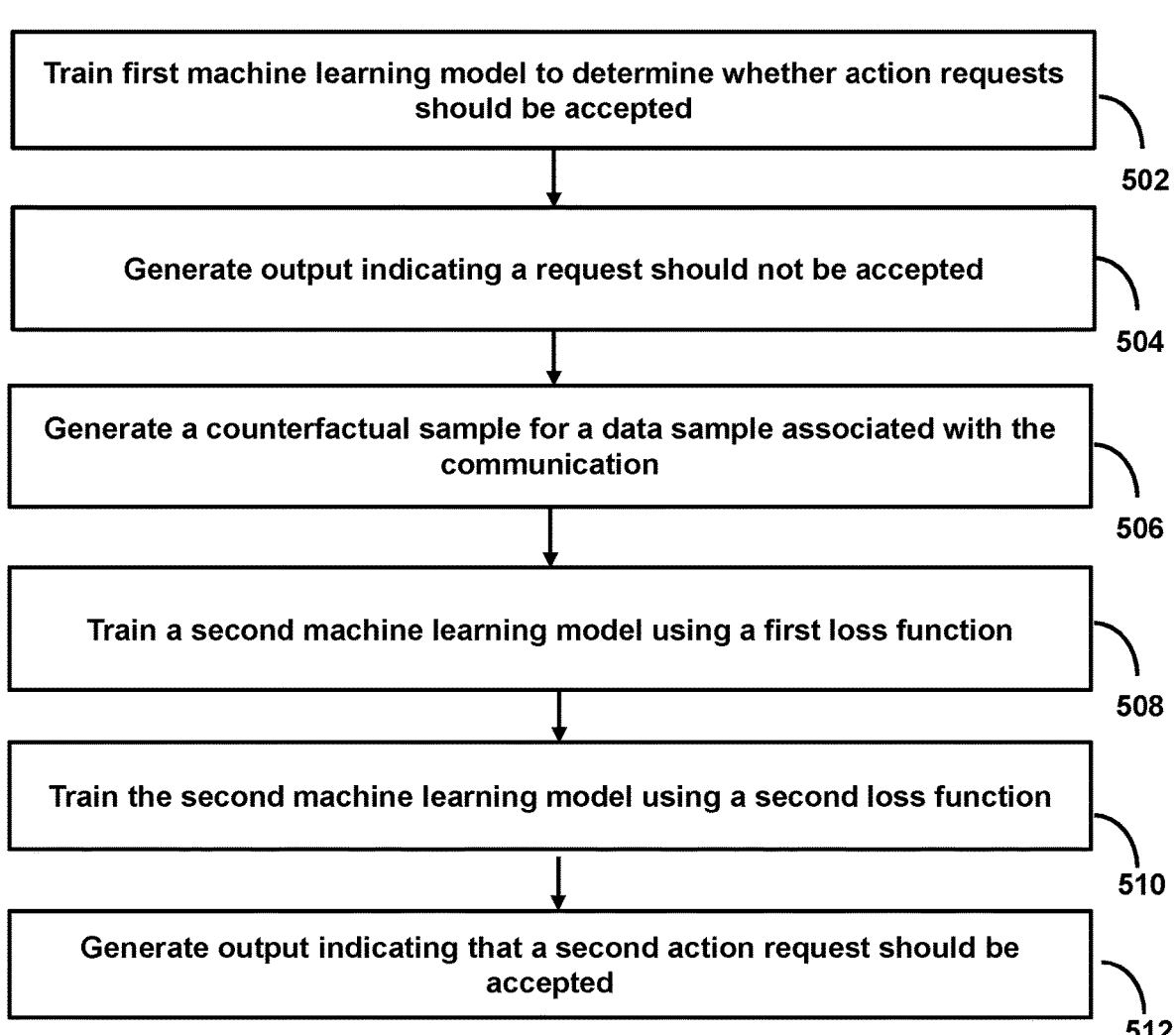

500

Train first machine learning model to determine whether action requests should be accepted

502

Generate output indicating a request should not be accepted

504

Generate a counterfactual sample for a data sample associated with the communication

506

Train a second machine learning model using a first loss function

508

Train the second machine learning model using a second loss function

510

Generate output indicating that a second action request should be accepted

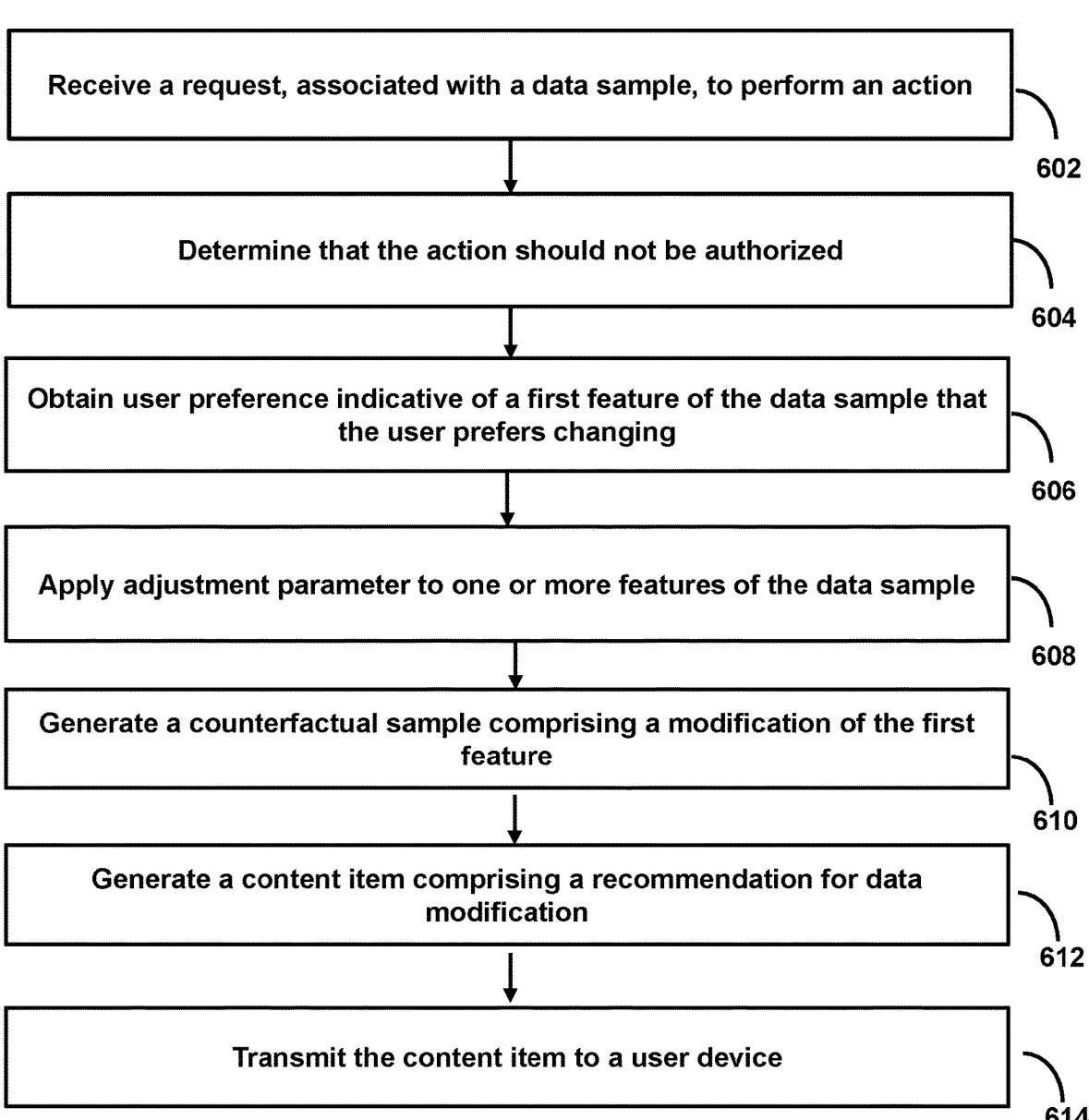

600

Receive a request, associated with a data sample, to perform an action

602

Determine that the action should not be authorized

604

Obtain user preference indicative of a first feature of the data sample that the user prefers changing

606

Apply adjustment parameter to one or more features of the data sample

608

Generate a counterfactual sample comprising a modification of the first feature

610

Generate a content item comprising a recommendation for data modification

612

Transmit the content item to a user device

COUNTERFACTUAL SAMPLES FOR MAINTAINING CONSISTENCY BETWEEN MACHINE LEARNING MODELS

BACKGROUND

Explainable artificial intelligence or machine learning includes a set of methods that allows human users to understand why certain results or output was generated by a machine learning model. Explainable machine learning may be used to explain a machine learning model's reasoning and characterize the strengths and weaknesses of the model's decision-making process. Explainable machine learning may be used to establish trust in the output generated by machine learning models. For example, for ethical reasons, legal reasons, and to increase trust, a doctor may desire to understand why a machine learning model is recommending a particular procedure for a patient.

SUMMARY

In explainable machine learning, counterfactual explanations can be used to explain machine learning model output for a given data sample. In general, a machine learning model generates output (e.g., a classification) for a data sample, and the particular feature values of the sample that were input to the model cause the output. A counterfactual sample may be created by modifying the feature values of a data sample. When input into a machine learning model, the class output by the machine learning model for the counterfactual sample may be opposite of the class output for the original sample. Alternatively, a counterfactual sample may cause the machine learning model to generate output that reaches a certain threshold (e.g., where the machine learning model outputs a probability that cancer is present reaches 10% or greater). A counterfactual sample of an original sample may try to minimize the amount of change to the feature values of the original sample while still changing the machine learning model's output.

Counterfactual samples can be used to explain why a machine learning model generated particular output because they are contrastive to a sample (e.g., the machine learning model generates a classification for the counterfactual sample that is opposite of the classification generated for the sample) and because a counterfactual sample is selective in that a counterfactual sample generally has a small number of feature changes compared to its corresponding sample.

For example, a counterfactual sample that a model classifies as not a cybersecurity breach may show, by comparison with a corresponding data sample, that the presence of a data outflow during non-working hours caused the model to classify a corresponding data sample as a cybersecurity breach. However, a problem with existing counterfactual techniques is that they are limited to explaining a single prediction (e.g., a single counterfactual sample corresponding to a single data sample). Because existing counterfactual explanation techniques explain only a single prediction, they provide only limited insight to explaining a model. However, understanding predictions for sub-populations within a larger population (e.g., through many data samples and their corresponding counterfactual samples) is important, since models often make predictions across a large population. In addition, creating a textual explanation for machine learning output for each individual counterfactual sample is labor intensive and inefficient.

In some aspects, to address these issues, non-conventional methods and systems described herein provide a mechanism for aggregating multiple counterfactual samples so that machine learning explanations can be generated for sub-populations. In addition, methods and systems described herein use machine learning and counterfactual samples to determine text to use in an explanation for a model's prediction. Specifically, a computing system may generate a counterfactual sample for a user, use a clustering model to assign the counterfactual sample to a cluster, and determine an explanation for the counterfactual sample and machine learning output. By doing so, a computing system may be better able to provide explanations by determining what sub-population a particular counterfactual sample belongs to. Further, the computing system may accelerate the creation of explanations for machine learning output.

In some aspects, a computing system may receive, from a user device, a communication to perform an action. The communication may be associated with a data sample corresponding to a user of the user device. Based on output generated via a machine learning model, the computing system may determine that the action should not be authorized. In response to determining that the action should not be authorized, the computing system may generate a counterfactual sample for the data sample. The counterfactual sample may cause the machine learning model to generate output indicating that the action should be authorized. The computing system may assign, via a cluster model, the counterfactual sample to a first cluster of a set of clusters. Based on assigning the counterfactual sample to the first cluster, the computing system may obtain a first content item of a plurality of content items.

Additionally, existing machine learning and counterfactual explanation techniques fail to address problems that occur as machine learning models are updated or replaced over time. For example, an existing computing system may reject, based on model output, a request from a computing device to perform an action. The computing system may generate a counterfactual sample to determine a change to recommend so that a future request is accepted. However, by the time the recommended change is implemented, the machine learning model used by the computing system may have been replaced with a second machine learning model. As a result, when the computing device submits the request a second time, the computing system may still reject the request based on output from the second model.

In some aspects, to address these issues, non-conventional methods and systems described herein train machine learning models to not only determine whether a request to perform an action should be accepted, but also to respect changes that were recommended by previous machine learning models. To achieve this, a computing system may alternate between two loss functions when training a machine learning model. The first loss function may be used to determine whether a request to perform an action should be accepted and may include comparing a predicted probability with a class label. The second loss function may try to minimize rejecting previously generated counterfactual samples. For example, the machine learning model may alternate training between different types of training data. The first type of training data may include any data sample and when input into the machine learning model, the model may use the first loss function to train. The second type of training data may include only counterfactual samples and when input into the machine learning model, the model may use the second loss function to train. By doing so, the computing system may prevent a second machine learning model from rejecting a counterfactual sample that was generated for a first machine learning model. This may allow machine learning model to be improved without making output generated by previous models obsolete.

In some aspects, a computing system may generate, via a first machine learning model, output indicating a request should not be accepted. The request may correspond to a first data sample. Based on the output indicating the request should not be accepted, the computing system may generate a counterfactual sample that includes a modification of the first data sample. For example, the modification may alter a value of a feature in the data sample such that when input into the first machine learning model, the first machine learning model generates output indicating that the communication should be accepted. The computing system may train a second machine learning model by alternating between a first training and a second training. The first training may include training, using a first loss function and a first portion of training data, the second machine learning model. The first loss function compares a first predicted probability of the second machine learning model with a first class label of the first portion of training data. The second training may include training, using a second loss function and a second portion of training data, the second machine learning model. The second loss function may cause adjustments to the second model to reduce a difference between a second predicted probability and a threshold for authorizing the action. The second portion of training data may include one or more counterfactual samples (e.g., and the first portion of training data may include no counterfactual samples).

Further, existing counterfactual sample generation techniques are inflexible in that they are unable to control what feature is changed in a data sample to create the counterfactual sample. This is problematic because when a change is recommended based on a feature that was altered to create the counterfactual sample, the recommendation may be infeasible. For example, due to competing demands, it may be infeasible for some computing systems to implement a recommendation to reduce cybersecurity breaches by reducing network traffic over a threshold amount.

In some aspects, to address these issues, non-conventional methods and systems described herein provide a mechanism for generating counterfactual samples that take preferences into account. Specifically, methods and systems described herein obtain preferences and then apply a penalty or adjustment parameter such that when a counterfactual sample is created, the computing system is forced to change one or more features indicated by the preferences to create the counterfactual sample. Solving this technical problem provides the practical benefit of giving users greater control over what changes to make to obtain favorable output from a machine learning model.

In some aspects, a computing system may receive, from a user device, a communication to perform an action. The communication may be associated with a data sample corresponding to a user of the user device. The computing system may determine, based on the data sample and via a first machine learning model, that the communication should not be authorized. Based on determining that the communication should not be authorized, the computing system may obtain a user preference indicative of a first feature of the data sample that the user prefers changing over a set of other features of the data sample. In response to obtaining the user preference, the computing system may apply an adjustment parameter to one or more features of the set of other features of the data sample. The computing system may generate, based on the adjustment parameter, a counterfactual sample that includes a modification of the first feature of the data sample. The modification may cause the first machine learning model to generate output indicating that the communication should be authorized.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in using counterfactual samples to determine content items to use in explaining rejections to users, in accordance with one or more embodiments.

FIG. 5 shows a flowchart of the steps involved in training a machine learning model to authorize a user based on a counterfactual sample generated by a previous machine learning model, in accordance with one or more embodiments.

FIG. 6 shows a flowchart of the steps involved in using user preferences for data feature modifications in counterfactual samples, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
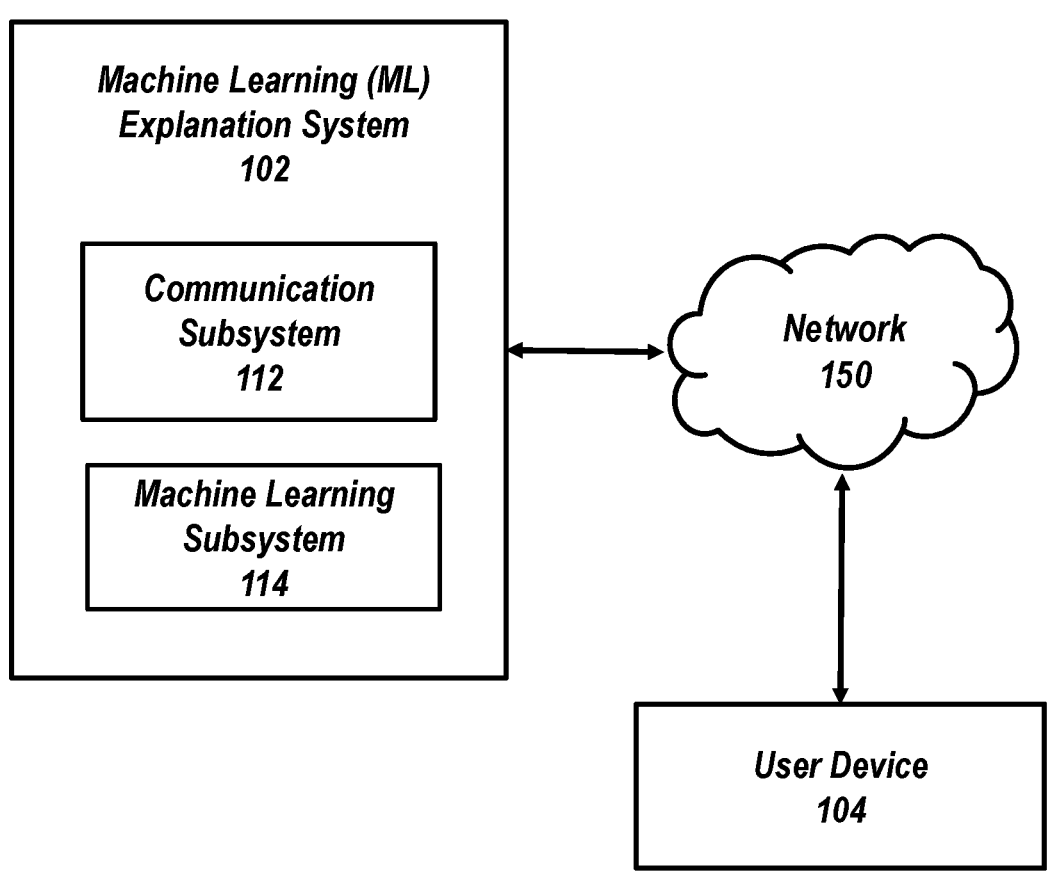
FIG. 1 shows an illustrative diagram for use of counterfactual samples, in accordance with one or more embodiments.

FIG. 1 shows an illustrative system 100 for using counterfactual samples, in accordance with one or more embodiments. The system 100 has numerous practical applications of machine learning models. For example, the system 100 can generate explanations (e.g., using counterfactual samples) for output generated by machine learning models that detect objects, determine whether a cyber security intrusion has occurred, detect the presence of cancer in medical data, approve or disapprove a user for a loan or other product offering, or a variety of other practical applications. The system 100 may aggregate multiple counterfactual samples so that machine learning explanations can be generated for sub-populations. In addition, the system 100 may use machine learning and counterfactual samples to determine text to use in an explanation for a model's prediction. The system 100 may train machine learning models to not only determine whether a request to perform an action should be accepted, but also to generate output that is consistent with output generated by previous machine learning models. Further, the system 100 may generate counterfactual samples based on user preferences. The system 100 may obtain preferences and then apply a penalty or adjustment parameter such that when a counterfactual sample is created, the computing system is forced to change one or more features indicated by the preferences to create the counterfactual sample.

FIG. 1 illustrates a machine learning (ML) explanation system 102. The ML explanation system 102 may include a communication subsystem 112 and a machine learning subsystem 114. The ML explanation system 102 may receive (e.g., via the communication subsystem 112 and from the user device 104) a communication (e.g., a request) to perform an action. An action may include sending data, processing data, generating a request to receive data via a network, or a variety of other data related actions. An action may include a banking related action or providing a banking product. For example, the action may include approving a loan, issuing a credit card or debit card, opening an account (e.g., a checking account, a savings account, a money market account), increasing a credit limit, issuing a certificate of deposit (CD), processing a mortgage, or a variety of other banking related actions. The communication may be received from a user, for example, via user interface input on the user device 104.

The communication may be associated with a data sample corresponding to the user. The data sample may be a feature vector that includes a plurality of values (e.g., numbers, characters, text, or a variety of other data). Each value may correspond to a particular attribute or characteristic, for example, of a user that made the request to perform an action. For example, a data sample used by a machine learning model for a banking application may include one or more values for age, income level, amount of debt, valuation of assets, credit history, savings amount, interest rate, or a variety of other banking related values.

The ML explanation system 102 may determine that the action indicated by the communication should not be authorized. The determination that the action should not be authorized may be based on output generated via a machine learning model (e.g., a machine learning model described above in connection with FIG. 3). For example, the data sample associated with the user that requested an action may be input into the machine learning model. The machine learning model may generate output indicating whether the requested action should be authorized. For example, the machine learning model may generate a probability that the user will fail to make a payment within a threshold period of time. The ML explanation system 102 may compare the probability with a threshold. If the threshold is satisfied, the ML explanation system 102 may determine that the action should not be authorized.

The ML explanation system 102 may generate a counterfactual sample for the data sample associated with the communication. As referred to herein, a "counterfactual sample" may include any set of values that is designed to cause a machine learning model to generate output that is different from a corresponding sample. A counterfactual sample may include the feature values of an original sample with some of the feature values having been modified such that the output of the machine learning model changes in a relevant way. For example, the class output by the machine learning model for the counterfactual sample may be opposite of the class output for the original sample. Additionally, or alternatively, a counterfactual sample may cause the machine learning model to generate output that reaches a certain threshold (e.g., where the machine learning model outputs a probability that a user fails to make a payment 10% or greater). When generating a counterfactual sample from an original sample, the ML explanation system 102 may try to minimize the amount of change to the feature values of the original sample while still changing the machine learning model's output.

A counterfactual sample may be generated using a variety of counterfactual sample generation techniques. For example, the ML explanation system 102 may use the multi-objective counterfactuals (MOC) method to generate the counterfactual samples. The MOC method may translate a search for counterfactual samples into a multi-objective optimization problem. In some embodiments. As an additional example, the ML explanation system 102 may use the Deep Inversion for Synthesizing Counterfactuals (DISC) method to generate the counterfactual samples. The DISC method may use (a) stronger image priors, (b) incorporate a novel manifold consistency objective, and (c) adopt a progressive optimization strategy. In some embodiments, the ML explanation system 102 may use counterfactual sample generation techniques that include accessing gradients of a machine learning model or accessing model internals of the machine learning model (e.g., accessing one or more layers or weights of a machine learning model).

The counterfactual sample, for example, when input into the machine learning model, may cause the machine learning model to generate output indicating that the action should be authorized. The counterfactual sample may be generated, for example, in response to determining that the action should not be authorized. For example, after determining that a user should not be authorized for a banking product, a counterfactual sample may be generated for the user to inform the user of one or more things the user can change to enable authorization of the banking product in the future. A banking product may include a loan, a card (e.g., credit card, debit card, cryptocurrency card), an account (e.g., a checking account, a savings account, a money market account), a line of credit, a certificate of deposit (CD), a mortgage, cryptocurrency (e.g., Bitcoin, Ethereum, a stable coin, etc.), or a variety of other banking related products.

The ML explanation system 102 may assign the counterfactual sample to a cluster (e.g., a first cluster) of a set of clusters. The ML explanation system 102 may use a clustering model (e.g., a machine learning model) to assign the counterfactual sample to a cluster. A clustering model may include a variety of unsupervised or supervised techniques for identifying and grouping data samples (e.g., similar data samples) in larger datasets. For example, the clustering model may implement affinity propagation, density-based spatial clustering of applications with noise (DBSCAN), K-means, K-medoids, or a variety of other clustering techniques. Each cluster in the set of clusters may include a plurality of counterfactual samples. Each counterfactual sample may be assigned to a particular cluster due to one or more commonalities between the counterfactual sample and other counterfactual samples in the cluster, for example, as determined by the clustering model.

In some embodiments, the ML explanation system 102 may use a distance score to determine which cluster to assign the counterfactual sample. For example, the ML explanation system 102 may generate a distance score indicating a distance between the counterfactual sample and a medoid or representative center of the first cluster. Based on determining that the distance score is lower than other distance scores associated with other clusters of the set of clusters, the ML explanation system 102 may assign the counterfactual sample to the first cluster. For example, the ML explanation system 102 may determine a distance between the counterfactual sample and each cluster in the set of clusters. The counterfactual sample may be assigned to the cluster that is closest in distance (e.g., the cluster associated with the lowest distance score).

A distance score may be a metric that indicates the distance between two points. For example, a distance score may indicate the distance between a sample (e.g., a data sample, a counterfactual sample, etc.) and a point that is representative of a cluster (e.g., a medoid, the center of a cluster, an item in a cluster, etc.) The distance score may be generated using Euclidean distance, Manhattan distance, Minkowski distance, Hamming distance, or a variety of other techniques.

In some embodiments, the ML explanation system 102 (e.g., via the machine learning subsystem 114 or the clustering model) may determine whether a new cluster should be generated. When assigning the counterfactual sample to a cluster, the ML explanation system 102 may determine that no cluster adequately matches the counterfactual sample, and thus may generate a new cluster for the counterfactual sample. The ML explanation system 102 may determine that no cluster adequately matches the counterfactual sample if distance scores generated for each existing cluster fail to satisfy a threshold distance. Alternatively, the ML explanation system 102 may input the counterfactual sample into the cluster model, determine, via the cluster model and based on the counterfactual sample, whether a new cluster should be generated, and in response to determining that a new cluster should not be generated, may assign the counterfactual sample to the first cluster.

Each cluster may be mapped to one content item of a plurality of content items. A content item may indicate one or more data modifications to facilitate acceptance of the communication to perform the action (e.g., facilitate authorization of the action by the machine learning model). A content item may indicate what a user should change to receive approval for an action requested by the user (e.g., the action indicated in the communication, a request for a banking related product, etc.). A content item may include video, images, text, or a variety of other content.

The ML explanation system 102 may obtain a first content item associated with the assigned cluster (e.g., a first cluster of the set of clusters). The first content item may indicate one or more data modifications to facilitate authorization of the action. A data modification may include a change to a data sample. A data modification may include a change to any characteristic associated with the user. The data modifications may correspond to changes to one or more features in the data sample. For example, if the data sample includes an indication of an amount of income of the user and an amount of debt of the user, the content item may include a data modification that indicates that a user should increase the user's income by a threshold amount or reduce debt by a threshold amount. A data modification may indicate a specific action that the user should take. For example, a data modification may indicate that the user should sell a particular car, pay off a credit card, sell a house, or a variety of other actions.

In some embodiments, content items may be stored in a database. The ML explanation system 102 may retrieve, from the database and based on a determination that the first content item corresponds to the first cluster, the first content item. In some embodiments, the content items may be generated in response to receiving a communication.

The ML explanation system 102 may transmit the first content item to the user device 104. The user device 104 may display the first content item in a user interface (e.g., a graphical user interface). The user device 104 may display the first content item as a user recommendation for facilitating acceptance of the communication (e.g., authorizing the action). The recommendation may include a suggested modification, in human readable text, to a value in the data sample that would result in the machine learning model determine that the communication should be authorized.

The ML explanation system 102 may train a machine learning model to determine whether a request to perform an action should be accepted, and to accept requests from users that have made changes based on counterfactual samples generated by other machine learning models (e.g., previous iterations of the machine learning model). The ML explanation system 102 may train a first machine learning model to determine whether a request to perform an action should be accepted. For example, the first machine learning model may be trained to determine whether a user should be approved for a loan, a credit card, or a variety of other banking products. The first machine learning model may be trained on a training dataset that includes a plurality of data samples (e.g., as described above). The training dataset may include a label for each data sample that indicates whether the user associated with the data sample failed to make a payment. The first machine learning model may be a variety of machine learning models, for example, as described in connection with FIG. 3.

The ML explanation system 102 may generate output indicating a request included in a communication should not be accepted. The communication may include a request to perform an action (e.g., a request for giving a loan, providing a credit card, or a variety of other banking products). The communication may be associated with a user and a corresponding data sample. For example, the communication may include the data sample. In some embodiments the system 102 may retrieve feature values of the data sample from one or more databases based on receiving the communication. The data sample may contain a variety of information about a user that is associated with the request. For example, the data sample may contain data about a user that wishes obtain a baking product or make a banking related request.

The ML explanation system 102 may generate a counterfactual sample for the data sample associated with the communication. The counterfactual sample may be generated in response to determining that the action (e.g., the action requested by the communication in step 504) should not be authorized. The counterfactual sample may be a modified copy of the data sample. For example, the modifications may include an increase in the feature of the data sample corresponding to income level. Thus, although the original data sample may be rejected (e.g., based on output generated by the machine learning model), the counterfactual sample may lead to output indicating that the request (e.g., the request indicated by the communication) should be granted.

A second machine learning model (e.g., a version of the first machine learning model that has received additional training, a replacement for the first machine learning model, etc.) may be trained so that the counterfactual sample yields consistent output between the first and second machine learning models. For example, after inputting the counterfactual sample into each model, output from both the first and second machine learning models may indicate that the request should be accepted. To help the second machine learning model generate output that is consistent with the first machine learning model, the ML explanation system 102 may alternate training of the second machine learning model using two different loss functions.

For example, the ML explanation system 102 may train the second machine learning model using a first loss function. The first loss function may compare a predicted probability with a class label. For example, if the predicted probability for a value associated with the class label is not greater than other probabilities corresponding to other classes (e.g., the probabilities for the incorrect class in a particular training data sample), the first loss function may be used to adjust one or more weights (e.g., of a neural network) such that future predictions are more accurate. As an additional example, if the predicted probability does not satisfy a threshold probability associated with the class label, the first loss function may be used to adjust one or more weights (e.g., of a neural network) such that future predictions are more accurate. In some embodiments, the ML explanation system 102 may train the second machine learning model by alternating between the first loss function and a second loss function. In some embodiments, the first loss function may be a binary cross-entropy function or a cross-entropy loss function.

Additionally or alternatively, the ML explanation system 102 may train the second machine learning model using a second loss function associated with counterfactual samples. The second loss function may be used for input data that includes counterfactual samples, and the first loss function may be used for input data that does not include counterfactual samples. For example, the second machine learning model may use the first loss function to determine adjustments for weights (e.g., using backpropagation) based on a first batch of training data. On a second batch of training data that includes counterfactual samples, the second machine learning model may use the second loss function to determine adjustments for the weights. The training process may alternate between using the first loss function for some training data, and the second loss function for other training data.

The second loss function may minimize a difference between a predicted probability and a threshold for accepting the communication (e.g., authorizing the request to perform the action). For example, the ML explanation system 102 may, via the second loss function, subtract a threshold for authorizing the request (e.g., a threshold amount of 0.2, 0.4, 0.6, etc.) from a probability that the user defaults (e.g., fails to pay an obligation in associated with the requested banking product). The probability that the user defaults may be generated by the second machine learning model. The ML explanation system 102 may train the second machine learning model such that a predicted probability of user default is minimized (e.g., given a user that has the same features as indicated in a counterfactual sample). By doing so, the ML explanation system 102 may reduce repeat turn downs for a user. For example, a request from a user, that has made adjustments based on modifications indicated by a counterfactual sample (e.g., the user reduced debt by an amount indicated in a counterfactual sample), will be less likely to be rejected by the second machine learning model. In some embodiments, the predicted probability may be a second predicted probability that is different from a first predicted probability used by the first loss function.

In some embodiments, the second loss function may use a second portion of training data that includes only counterfactual samples. The second portion of training data may be generated by the ML explanation system 102. For example, the ML explanation system 102 may obtain a plurality of data samples corresponding to communications with requests for actions that were not accepted. The ML explanation system 102 may generate, based on the plurality of data samples, a plurality of counterfactual samples. Each counterfactual sample of the plurality of counterfactual samples may cause the first machine learning model to generate output indicating that a corresponding request should be accepted. The ML explanation system 102 may generate the second portion of training data based on the plurality of counterfactual samples. For example, the second portion of training data may comprise the plurality of counterfactual samples.

The ML explanation system 102 may generate output indicating that a second request should be accepted. The output may be generated via the second machine learning model. The output may be based on the counterfactual sample and may be associated with a user. For example, the same user may make a first request that is rejected, receive a counterfactual sample indicating a change to make, and then make a second request after making the change. Using the first machine learning model, the first request (e.g., made via the communication described above) may be rejected and a counterfactual sample for the user may be generated. After making one or more changes indicated by the counterfactual sample, the user may send a second request (e.g., for a banking product). An updated data sample may be generated for the user that reflects the changes made by the user. The updated data sample may match the counterfactual sample generated for the user. Based on inputting the updated data sample associated with the one or more changes made by the user into the second machine learning model, the ML explanation system 102 may determine that the second request should be authorized. For example, the second request may be authorized because the second machine learning model generates a predicted probability that the user defaults and the predicted probability is less than a threshold probability.

In some embodiments, a user interface may be generated to show the progress of training the second machine learning model. For example, the ML explanation system 102 may generate a user interface associated with the second machine learning model and may use the user interface to display a first loss value corresponding to the first loss function, a second loss value corresponding to the second loss function. The user interface may display one or more counterfactual samples that are associated with the first loss value or second loss value.

In some embodiments, a counterfactual sample may be generated based on one or more user preferences. The ML explanation system 102 may obtain a user preference indicative of a first feature of the data sample that the user prefers changing. The user preference may be obtained in response to determining that the communication or the action indicated by the communication should not be authorized. For example, in response to rejecting a user's request for a credit card, a user may be prompted for input to determine what the user would prefer to change so that the credit card may be issued to the user. The user preference may indicate that the user would change the first feature rather than other features of the data sample. For example, the user preference may indicate that the user would prefer moving to a different zip code rather than decreasing debt, increasing income, or having a co-signer for a loan.

The ML explanation system 102 may apply an adjustment parameter to one or more features of the data sample. The adjustment parameter may be applied in response to obtaining the user preference. The adjustment parameter may cause counterfactual samples to be generated by modifying the first feature instead of the one or more features of the data sample. For example, if the user preference indicates that the user would prefer moving to a different zip code, the adjustment parameter may be applied to a feature associated with debt, a feature associated with income, and a feature associated with having a co-signer. In this example, the ML explanation system 102 may avoid applying the adjustment parameter to the feature associated with the user's zip code.

In some embodiments, the ML explanation system 102 may exercise control over which of the features the user is able to prefer. For example, if there are two features of which only one may reliably have a penalty applied, the ML explanation system 102 may force the user to select only one of the two features. The ML explanation system 102 may force the user to select only one of the two features by presenting both features and having the user select only one of them. For example, the ML explanation system 102 may generate text that prompts the user to indicate which of the first feature or a second feature of the data sample the user prefers changing. The ML explanation system 102 may send the text to a user device. In response to sending the text, the ML explanation system 102 may obtain a user preference indicative of the first feature of the data sample.

In some embodiments, the user may provide one or more ranked preferences that indicate an ordering of features that the user prefers to change. For example, the ranked preferences may indicate that the user would rather first increase the user's income, second reduce the user's debt, and third obtain a co-signer. One or more adjustment parameters may be weighted based on the ranked preferences, for example a larger penalty may be applied to a lower ranked feature (e.g., a first feature), a medium penalty (e.g., smaller than a first threshold penalty and larger than a second threshold penalty) may be applied to a middle-ranked feature (e.g., a second feature), and no penalty may be applied to the user's top ranked feature (e.g., a third feature).

In some embodiments, a user preference may indicate to what degree the user prefers a particular feature is changed. For example, the user preference may be a preference level or score indicating how strongly the user prefers a feature to change over other features. The ML explanation system 102 may apply the adjustment parameter (e.g., penalty) to one or more features based on the preference level. For example, the ML explanation system 102 may determine a first proportional adjustment parameter that is proportional to the user preference. The ML explanation system 102 may determine a second proportional adjustment parameter. the ML explanation system 102 may apply the first proportional adjustment parameter to a first subset of the set of other features (e.g., the features not indicated by a user preference) and apply the second proportional adjustment parameter to a second subset of the set of other features.

In some embodiments, the ML explanation system 102 may determine the adjustment parameter based on a preference level indicated by the user preference. For example, the ML explanation system 102 may determine that the user preference satisfies a threshold preference level. Based on the user preference satisfying the threshold preference level, the ML explanation system 102 may select a first adjustment parameter from a set of adjustment parameters (e.g., penalties) and may apply the first adjustment parameter to the one or more features of the set of other features (e.g., the features not indicated by the user preference).

The ML explanation system 102 may generate a counterfactual sample comprising a modification of the first feature. The counterfactual sample may be generated based on one or more adjustment parameters. The modification may cause the first machine learning model to generate output indicating that the communication or the action associated with the communication should be authorized. For example, after inputting the counterfactual sample into the first machine learning model, the first machine learning model may generate output that includes a probability that a user that has characteristics matching the counterfactual sample will default. The ML explanation system 102 may compare the probability with a threshold. If the threshold is satisfied (e.g., if the probability is less than the threshold), the ML explanation system 102 may determine that an action requested by a user that matches the counterfactual sample should be authorized.

By using one or more adjustment parameters, the ML explanation system 102 may be able to generate a counterfactual sample that changes a feature that the user prefers to change. This may enable the ML explanation system 102 to generate fewer counterfactual samples because each counterfactual sample may be targeted to a user's preferences. By doing so, the ML explanation system 102 may be more efficient and use fewer computing resources because less counterfactual samples are generated. Additionally, this may make it easier for the user to qualify for banking products.

Figure 2:
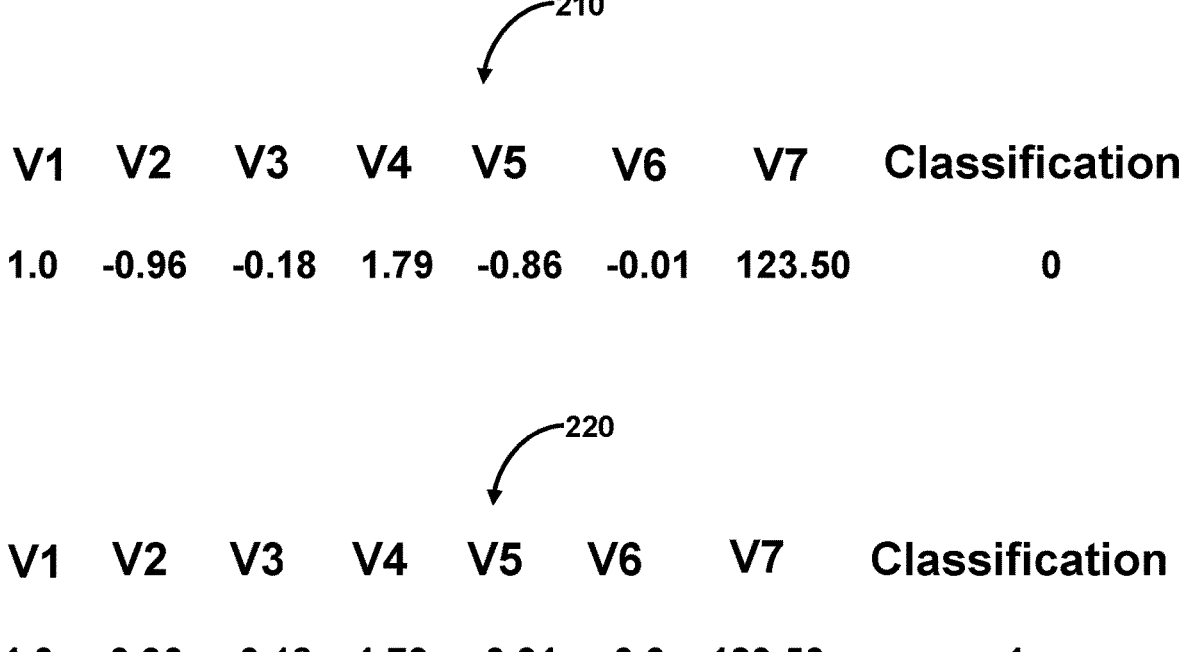
FIG. 2 shows an illustrative data sample and counterfactual sample, in accordance with one or more embodiments.

FIG. 2 shows an illustrative diagram for a sample 210 and a corresponding counterfactual sample 220, in accordance with one or more embodiments. The sample 210 is part of a dataset of users that were classified as high risk or low risk by a machine learning model. A high risk user may be denied a banking product, while a low risk user's request for a banking product may be accepted. The sample 210 includes a set of feature values V1-V7 and a classification. The classification indicates that the sample 210 was classified as high risk. The counterfactual sample 220 is the same as the sample 210 except that the feature values V5-V6 have been modified. As a result of the modification, the machine learning model classified the counterfactual sample 220 as low risk. Systems and methods described herein may generate the counterfactual sample 220. For example, the user may indicate that the user prefers changing feature V5-V6 over features V1-V4 and V7. By applying an adjustment parameter (e.g., as described above) to features V1-V4 and V7, the ML explanation system 102 may generate the counterfactual sample 220 by causing features V5-V6 to change.

In some embodiments, the counterfactual sample 220 may be assigned to a cluster and an explanation for why a banking product was denied may be obtained based on the assigned cluster. (e.g., as described above in connection with FIG. 1). In some embodiments, the counterfactual sample 220 may be generated based on a first machine learning model. The first machine learning model may output a classification of 1 when the counterfactual sample is input into the first machine learning model. A second machine learning model may be trained using two different loss functions such that the second machine learning model outputs the same classification of the counterfactual sample 220 that was output by the first machine learning model. For example, the second machine learning model may be trained as described above in connection with FIG. 1.

Figure 3:
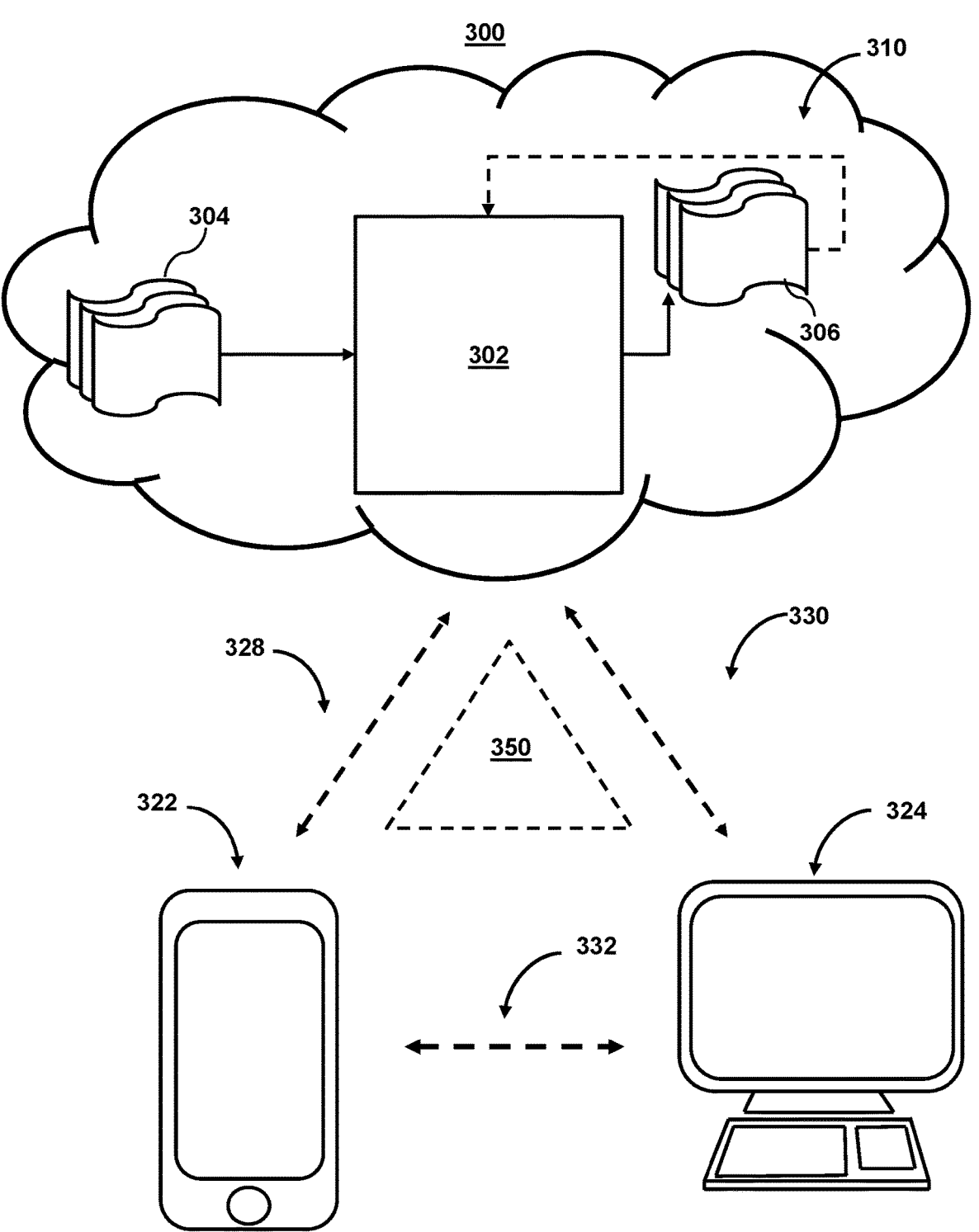
FIG. 3 shows illustrative components for a system used for generating counterfactual samples and machine learning explanations, in accordance with one or more embodiments.

FIG. 3 shows illustrative components for a system used to generate counterfactual samples, use counterfactual samples to generate explanations, train machine learning models, or perform a variety of other tasks described herein, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1-2. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IP TV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the ML explanation system 102, the network 150, or the user device 104 described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known classification (e.g., classify a data sample or counterfactual sample to indicate whether a corresponding user will fail to make a payment or perform an obligation).

In a variety of embodiments, model 302 may update its configurations (e.g., weights, biases, or other parameters)

based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. A counterfactual sample that is input into the model (e.g., model 302) may be assigned to a cluster of counterfactual samples to determine an explanation for why a request was denied (e.g., to generate a turn down notice).

System 300 also includes application programming interface (API) layer 350. API layer 350 may allow the system to generate summaries across different devices. In some embodiments, API layer 350 may be implemented on user device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

FIG. 4 shows a flowchart of the steps involved in involved in using counterfactual samples to determine content items to use as an explanation of a rejection to users. In some embodiments, the system may use process 400 (e.g., as implemented on one or more system components described above) to generate an adverse action notice (e.g., a turn down reason). For example, the adverse action notice may provide an explanation for why a user was not approved for a banking product (e.g., a loan, a credit card, etc.). Process 400 of FIG. 4 may represent the actions taken by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, the ML explanation system 102 may receive a communication to perform an action. For example, the system may receive, from a user device, a communication to perform an action, wherein the communication is associated with a data sample corresponding to a user of the user device. The system may receive the communication from a user, for example, via user interface input on the user device 104. As an example, the system may receive an action that includes a request to create an account (e.g., for a credit card, a checking account, etc.), a request for a loan, or other banking related request. The communication may be associated with a data sample corresponding to the user. The data sample may include a variety of data associated with the user, for example, as described above in connection with FIGS. 1-3.

At step 404, the ML explanation system 102 may determine that the action indicated by the communication in step 402 should not be authorized. The ML explanation system 102 may determine that the action should not be authorized may be based on output generated via a machine learning model (e.g., a machine learning model described above in connection with FIGS. 1-3). For example, the data sample associated with the communication or the user may be input into the machine learning model. In this example, the machine learning model may generate a probability that the user will cause a charge-off (e.g., that a lender or creditor will write off an amount associated with the user as a loss). The ML explanation system 102 may compare the probability with a threshold. If the threshold is satisfied, the ML explanation system 102 may determine that the action should not be authorized.

At step 406, the ML explanation system 102 may generate a counterfactual sample for the data sample associated with the communication. The counterfactual sample, for example, when input into the machine learning model, may cause the machine learning model to generate output indicating that the action should be authorized. The counterfactual sample may be generated, for example, in response to determining that the action should not be authorized. For example, after determining that a user should not be authorized for a banking product, a counterfactual sample may be generated for the user to inform the user of one or more things the user can change to enable authorization of the banking product in the future. The counterfactual sample may include any counterfactual sample described above in connection with FIGS. 1-3, or a variety of other counterfactual samples.

At step 408, the ML explanation system 102 may assign the counterfactual sample to a cluster (e.g., a first cluster) of a set of clusters. The ML explanation system 102 may use a clustering model (e.g., a machine learning model) to assign the counterfactual sample to a cluster. Each cluster in the set of clusters may include a plurality of counterfactual samples. Each counterfactual sample may be assigned to a particular cluster due to one or more commonalities between the counterfactual sample and other counterfactual samples in the cluster, for example, as determined by the clustering model. Each cluster may be mapped to one content item of a plurality of content items. A content item may indicate one or more data modifications to facilitate acceptance of the communication to perform the action (e.g., facilitate authorization of the action by the machine learning model). A content item may include text that explains what a user should change to receive approval for an action requested by the user (e.g., the action indicated in the communication at step 402, a request for a banking related product, etc.). A content item may include any content described above in connection with FIGS. 1-3. By determining which cluster the counterfactual sample belongs to, the ML explanation system 102 may be able to obtain a textual explanation for a turn down reason. Doing so increases the efficiency of the system because it enables the system to avoid having to generate a new explanation for each new counterfactual sample.

In some embodiments, the ML explanation system 102 may use a distance score to determine which cluster to assign the counterfactual sample. For example, the ML explanation system 102 may generate a distance score indicating a distance between the counterfactual sample and a medoid or representative center of the first cluster. Based on determining that the distance score is lower than other distance scores associated with other clusters of the set of clusters, the ML explanation system 102 may assign the counterfactual sample to the first cluster.

At step 410, the ML explanation system 102 may obtain a first content item associated with the assigned cluster (e.g., a first cluster of the set of clusters). The first content item may indicate one or more data modifications to facilitate authorization of the action. The data modifications may correspond to changes in the data sample. For example, if the data sample includes an indication of an amount of income of the user and an amount of debt of the user, the content item may indicate that a user should increase the user's income by a threshold amount or reduce debt by a threshold amount.

At step 412, the ML explanation system 102 may transmit the first content item to the user device 104. The user device 104 may display the first content item in a user interface (e.g., a graphical user interface). The user device 104 may display the first content item as a user recommendation for facilitating acceptance of the communication (e.g., authorizing the action). The recommendation may include a suggested modification, in human readable text, to a value in the data sample that would result in the machine learning model determining that the communication should be authorized.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

FIG. 5 shows a flowchart of the steps involved in reducing the generation of new output that conflicts with output that was previously generated. The steps may allow a computing system to use updated or new machine learning models while reducing the chance that output generated by the updated or new machine learning models conflicts with output that was generated by a previous iteration of a machine learning model. The steps in FIG. 5 may prevent a situation where a user is rejected from a banking product multiple times despite making one or more changes that were suggested to the user. For example, a user may receive feedback via a first machine learning model indicating that the user should increase their income. The user may increase the user's income, but despite the increase, a second machine learning model may reject the user when applying for the banking product a subsequent time. To avoid this scenario, a machine learning model may be trained as described in the steps below.

In some embodiments, the system may use process 500 (e.g., as implemented on one or more system components described above) to generate an adverse action notice (e.g., a turn down reason). For example, the adverse action notice may provide an explanation for why a user was not approved for a banking product (e.g., a loan, a credit card, etc.). Process 500 of FIG. 5 may represent the actions taken by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 502, the ML explanation system 102 may train a first machine learning model to determine whether a communication for actions (e.g., a request to perform actions) should be accepted. For example, the first machine learning model may be trained to determine whether a user should be approved for a loan, a credit card, or a variety of other banking products. The machine learning model may be configured to generate output indicating a probability that the user will fail to pay debt in connection with the banking product being requested. The first machine learning model may be a variety of machine learning models including those described above in connection with FIGS. 1-4.

At step 504, the ML explanation system 102 may generate output indicating a request should not be accepted. For example, the ML explanation system 102 may generate, via the first machine learning model, output indicating a communication should not be accepted. The communication may include a request to perform an action (e.g., a request for giving a loan, providing a credit card, or a variety of other banking products). The communication may be associated with a data sample. The data sample may include any data described above in connection with FIGS. 1-4.

At step 506, the ML explanation system 102 may generate a counterfactual sample for the data sample associated with the communication. The counterfactual sample may be generated in response to determining that the action (e.g., the action requested by the communication in step 504) should not be authorized. The counterfactual sample may be a counterfactual sample as described above in connection with FIGS. 1-3. The counterfactual sample may be a modified copy of the data sample. For example, one or more features of the data sample may be adjusted to generate the counterfactual sample. The modifications made to the data sample, may cause the machine learning model to generate output indicating that the communication should be accepted. For example, the modifications may include an increase in the feature of the data sample corresponding to salary. Thus, although the original data sample may be rejected (e.g., by the machine learning model), the counterfactual sample may lead to output indicating that the request (e.g., the request in step 504) should be granted.

At step 508, the ML explanation system 102 may train a second machine learning model using a first loss function. The first loss function may compare a predicted probability with a class label. For example, if the predicted probability for a value associated with the class label is not greater than other probabilities corresponding to other classes (e.g., the probabilities for the incorrect class in a particular training data sample), the first loss function may be used to adjust one or more weights (e.g., of a neural network) such that future predictions are more accurate. As an additional example, if the predicted probability does not satisfy a threshold probability associated with the class label, the first loss function may be used to adjust one or more weights (e.g., of a neural network) such that future predictions are more accurate. In some embodiments, the ML explanation system 102 may train the second machine learning model by alternating between the first loss function and a second loss function (e.g., the second loss function described in more detail in connection with step 510).

At step 510, the ML explanation system 102 may train the second machine learning model using a second loss function associated with counterfactual samples. The second loss function may be used for input data that includes counterfactual samples, and the first loss function may be used for input data that does not include counterfactual samples. For example, the second machine learning model may use the first loss function to determine adjustments for weights (e.g., using backpropagation) based on a first batch of training data. On a second batch of training data that includes counterfactual samples, the second machine learning model may use the second loss function to determine adjustments for the weights. The training process may alternate between using the first loss function for some training data, and the second loss function for other training data. By doing so, the second machine learning model may learn to avoid rejecting requests from users that have made any recommended changes to enable the user to qualify for a banking product. This may increase the efficiency of the system 102 because it improves the machine learning model and thereby reduces the amount of repeat requests for banking products. Additionally or alternatively, doing so may increase the trustworthiness of the first and second machine learning models or an organization that is using the first and second machine learning models.

The second loss function may minimize a difference between a predicted probability and a threshold for accepting the communication (e.g., authorizing the request to perform the action). For example, the ML explanation system 102 may, via the second loss function, subtract a threshold for authorizing the request (e.g., a threshold amount of 0.2, 0.4, 0.6, etc.) from a probability that the user defaults (e.g., fails to pay an obligation in associated with the requested banking product). The ML explanation system 102 may train the second machine learning model such that a predicted probability for a counterfactual sample is minimized. By doing so, the ML explanation system 102 may reduce repeat turn downs for a user. For example, a request from a user, that has made adjustments based on modifications indicated by a counterfactual sample (e.g., the user reduced debt by an amount indicated in a counterfactual sample), will be less likely to be rejected by the second machine learning model. In some embodiments, the predicted probability may be a second predicted probability that is different from a first predicted probability used by the first loss function.

In some embodiments, a portion of the training data may include counterfactual samples. For example, the ML explanation system 102 may obtain a plurality of data samples corresponding to communications that were not accepted, generate a plurality of counterfactual samples, wherein each counterfactual sample of the plurality of counterfactual samples causes the first machine learning model to generate output indicating that a corresponding communication should be accepted, and may generate the second portion of training data based on the plurality of counterfactual samples.

At step 512, the ML explanation system 102 may generate output indicating that a second request should be accepted. The output may be generated via the second machine learning model. The output may be based on the counterfactual sample. For example, a user associated with the second request may have previously sent the communication in step 504. Using the first machine learning model, a request in the communication may have been rejected and a counterfactual sample associated with the user may have been generated. After making one or more changes indicated by the counterfactual sample, the user may send the second request. Based on inputting a data sample associated with the one or more changes made by the user into the second machine learning model, the ML explanation system 102 may determine that the second request should be authorized. For example, the second request may be authorized because the second machine learning model generates a predicted probability that the user defaults and the predicted probability is less than a threshold probability.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

FIG. 6 shows a flowchart of the steps involved in using preferences to determine what modifications to make to facilitate authorization of a request. The steps may enable the ML explanation system 102 to generate a counterfactual sample for a user based on the features that the user prefers to change. For example, the user may indicate that the user would rather reduce debt than increase income. The ML explanation system 102 may then generate a counterfactual in accordance with the preference (e.g., a counterfactual sample where the amount of debt is changed but the income amount remains the same).

In some embodiments, the system may use process 600 (e.g., as implemented on one or more system components described above) to generate an adverse action notice (e.g., a turn down reason). For example, the adverse action notice may provide an explanation for why a user was not approved for a banking product (e.g., a loan, a credit card, etc.). Process 600 of FIG. 6 may represent the actions taken by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 602, the ML explanation system 102 may receive a request to perform an action. The request may be associated with a data sample (e.g., a data sample as described in connection with FIGS. 1-5 above). For example, the request may be a request for a loan or other banking product, and the data sample may be generated based on the user that made the request. The data sample may include a variety of data about the user as described above in connection with FIGS. 1-5.

At step 604, the ML explanation system 102 may determine that the action should not be authorized, for example, as described above in connection with step 404 of FIG. 4. For example, the ML explanation system 102 may determine, based on the data sample and via a first machine learning model, that the action should not be authorized.

At step 606, the ML explanation system 102 may obtain a user preference indicative of a first feature of the data sample that the user prefers changing. The user preference may be obtained in response to determining that the communication or the action indicated by the communication should not be authorized. For example, in response to rejecting a user's request for a credit card, a user may be prompted for input to determine what the user would prefer to change so that the credit card may be issued to the user.

The user preference may indicate that the user would change the first feature rather than other features of the data sample. For example, the user preference may indicate that the user would prefer moving to a different zip code rather than decreasing debt, increasing income, or having a co-signer for a loan.

In some embodiments, obtaining the user preferences may include presenting a question to the user. For example, the ML explanation system 102 may generate text that prompts the user to indicate which of the first feature or a second feature of the data sample the user prefers changing, send the text to a user device, and in response to sending the text, obtain the user preference indicative of the first feature of the data sample. In some embodiments, the ML explanation system 102 may generate a list of features of the data sample, send the list of features to a user device, and in response to sending the list of features to the user device, receive a ranked ordering of features that indicates a preference for changing the first feature over the set of other features of the data sample At step 608, the ML explanation system 102 may apply an adjustment parameter to one or more features of the data sample. The adjustment parameter may be applied in response to obtaining the user preference. The adjustment parameter may cause counterfactual samples to be generated by modifying the first feature instead of the one or more features of the data sample. For example, if the user preference indicates that the user would prefer moving to a different zip code, the adjustment parameter may be applied to a feature associated with debt, a feature associated with income, and a feature associated with having a co-signer. In this example, the ML explanation system 102 may avoid applying the adjustment parameter to the feature associated with the user's zip code. The adjustment parameter may include any adjustment parameter discussed in connection with FIGS. 1-5 above.

In some embodiments, the ML explanation system 102 may apply an adjustment parameter that prevents a feature from being changed. For example, the ML explanation system 102 may determine a second feature of the one or more features that cannot be changed by actions taken by the user, and based on the second feature being unchangeable by the user, apply a adjustment parameter to the second feature.

At step 610, the ML explanation system 102 may generate a counterfactual sample comprising a modification of the first feature. The counterfactual sample may be generated based on the adjustment parameter. The modification may cause the first machine learning model to generate output indicating that the communication or the action associated with the communication should be authorized. For example, after inputting the counterfactual sample into the first machine learning model, the first machine learning model may generate output that includes a probability that a user that has characteristics matching the counterfactual sample will default. The ML explanation system 102 may compare the probability with a threshold. If the threshold is satisfied (e.g., if the probability is less than the threshold), the ML explanation system 102 may determine that an action requested by a user that matches the counterfactual sample should be authorized.

By using one or more adjustment parameters, the ML explanation system 102 may be able to generate a counterfactual sample that changes a feature that the user prefers to change. This may enable the ML explanation system 102 to generate fewer counterfactual samples because each counterfactual sample may be targeted to a user's preferences. By doing so, the ML explanation system 102 may be more efficient and use fewer computing resources because less counterfactual samples are generated. Additionally, this may make it easier for the user to qualify for banking products.

At step 612, the ML explanation system 102 may generate a content item that includes a recommendation for data modification. For example, the ML explanation system 102 may generate, based on the counterfactual sample, a content item comprising a recommendation for modification to a value in the data sample that would result in the first machine learning model predicting that the communication should be authorized. The content item may include text that indicates to what degree the users preferred feature would need to change to authorize the request. For example, the content item may indicate that the user's income would need to increase by $5,000 for the user to be authorized for a mortgage. The content item may be any content item described above in connection with FIGS. 1-5.

At step 614, the ML explanation system 102 may transmit the content item to a user device. For example, the ML explanation system 102 may transmit the content item to the user device 104 for display in a user interface.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, from a user device, a communication to perform an action; determining that the communication should not be authorized; and generating a counterfactual sample for a data sample.

2. The method of the preceding embodiment, further comprising: assigning, via a cluster model, the counterfactual sample to a first cluster of a set of clusters; based on assigning the counterfactual sample to the first cluster, obtaining a first content item of a plurality of content items, wherein the first content item indicates one or more data modifications to facilitate acceptance of the communication to perform the action; and sending the first content item to the user device.

3. The method of any of the preceding embodiments, wherein assigning the counterfactual sample to the first cluster comprises: generating a distance score indicating a distance between the counterfactual sample and a medoid of the first cluster; and based on determining that the distance score is lower than other distance scores associated with other clusters of the set of clusters, assigning the counterfactual sample to the first cluster.

4. The method of any of the preceding embodiments, wherein assigning the counterfactual sample to a first cluster of a set of clusters comprises: inputting the counterfactual sample into the cluster model; determining, via the cluster model and based on the counterfactual sample, whether a new cluster should be generated; and in response to determining that a new cluster should not be generated, assigning the counterfactual sample to the first cluster.

5. The method of any of the preceding embodiments, wherein each cluster of the set of clusters is mapped to one content item of a plurality of content items, and wherein obtaining the first content item comprises: retrieving, from a database and based on a determination that the first content item corresponds to the first cluster, the first content item.

6. The method of any of the preceding embodiments, wherein obtaining the first content item comprises: determining, based on a comparison of the counterfactual sample with the data sample, a feature that was modified to create the counterfactual sample; determining, based on a keyword associated with the feature, an action corresponding to the feature; and generating text indicating that the user may perform the action to modify the feature.

7. The method of any of the preceding embodiments, wherein generating an counterfactual sample for the data sample comprises accessing gradients of the machine learning model or accessing model internals of the machine learning model.

8. The method of any of the preceding embodiments, further comprising: training the machine learning model by alternating between a first training and a second training, the first training comprising: training, using a first loss function and a first portion of training data, the machine learning model, wherein the first loss function compares a first predicted probability of the machine learning model with a first class label of the first portion of training data; and the second training comprising: training, using a second loss function and a second portion of training data, the machine learning model, wherein the second loss function minimizes a difference between a second predicted probability and a threshold for accepting the communication, and wherein the second portion of training data comprises the counterfactual sample.

9. The method of any of the preceding embodiments, wherein generating an counterfactual sample comprises: obtaining a user preference indicative of a first feature of the data sample that a user prefers changing over a set of other features of the data sample, wherein the set of other features does not include the first feature; in response to obtaining the user preference, applying a penalty to one or more features of the set of other features of the data sample, wherein the penalty causes counterfactual samples to be generated by modifying the first feature instead of the one or more features of the set of other features; and generating, based on the penalty, the counterfactual sample.

10. The method of any of the preceding embodiments, further comprising: generating a user interface that comprises a representation of each cluster of the set of clusters and a distance between the counterfactual sample and any cluster of the set of clusters.

11. The method of any of the preceding embodiments, further comprising: determining, that the counterfactual sample is more than a threshold distance from the first cluster and less than a threshold distance from a second cluster of the set of clusters; and based on the counterfactual sample being more than a threshold distance from the first cluster and less than a threshold distance from a second cluster of the set of clusters, sending a message to a user device.

12. The method of any of the preceding embodiments, wherein the cluster model comprises a K-medoids, DB SCAN, or spectral clustering model.

13. A method comprising: generating, via a first machine learning model, output indicating a communication should not be accepted, wherein the communication corresponds to a first data sample; based on the output indicating the communication should not be accepted, generating an counterfactual sample comprising a modification for the first data sample; and training a second machine learning model by alternating between a first training and a second training, the first training comprising: training, using a first loss function and a first portion of training data, the second machine learning model; and the second training comprising: training, using a second loss function and a second portion of training data, the second machine learning model.

14. The method of any of the preceding embodiments, further comprising: receiving a new communication to perform an action, wherein the new communication is associated with a second data sample and a previous communication that was not accepted, and wherein the new communication corresponds to a modified version of the second data sample; based on inputting the modified version of the second data sample into the second machine learning model, generating output indicating that the communication should be accepted; and sending, to a user device associated with the modified version of the second data sample, an indication that the communication has been accepted.

15. The method of any of the preceding embodiments, further comprising: based on generating the counterfactual sample, assigning, via a clustering model, the counterfactual sample to a first cluster of a set of clusters, wherein each cluster of the set of clusters comprises a plurality of counterfactual samples, and wherein the first cluster is mapped to a first content item of a plurality of content items; and sending, to a user device associated with the counterfactual sample, the first content item, wherein the first content item indicates a reason why the communication is not accepted.

16. The method of any of the preceding embodiments, further comprising: obtaining a user preference indicative of a first feature of the first data sample that a user prefers changing over a set of other features of the first data sample, wherein the set of other features does not include the first feature; in response to obtaining the user preference, applying a penalty to one or more features of the set of other features of the first data sample, wherein the penalty causes counterfactual samples to be generated by modifying the first feature instead of the one or more features of the set of other features; and generating, based on the penalty, a counterfactual sample comprising a modification of the first feature of the first data sample, wherein the modification causes the first machine learning model to generate output indicating that the communication should be accepted.

17. The method of any of the preceding embodiments, wherein generating, via the first machine learning model, output indicating an action communication should not be accepted comprises: generating, via the first machine learning model, a probability associated with the action communication; and based on the probability being above a threshold probability, determining that the action communication should not be accepted.

18. The method of any of the preceding embodiments, wherein training the second machine learning model comprises: generating a user interface associated with the second machine learning model; and using the user interface to display a first loss value corresponding to the first loss function, a second loss value corresponding to the second loss function, and a plurality of counterfactual samples.

19. The method of any of the preceding embodiments, further comprising generating the second portion of training data by: obtaining a plurality of data samples corresponding to communications that were not accepted; generating, based on the plurality of data samples, a plurality of counterfactual samples, wherein each counterfactual sample of the plurality of counterfactual samples causes the first machine learning model to generate output indicating that a corresponding communication should be accepted; and generating the second portion of training data based on the plurality of counterfactual samples.

20. The method of any of the preceding embodiments, wherein generating an counterfactual sample comprises: determine, based on a recommended action associated with the first data sample, a feature of the first data sample; and generating the counterfactual sample by modifying the feature of the first data sample.

21. The method of any of the preceding embodiments, wherein the first portion of training data corresponds to a first set of users and the second portion of training data corresponds to a second set of users, and wherein the first set of users and the second set of users do not overlap.

22. The method of any of the preceding embodiments, wherein the first loss function comprises a binary cross-entropy function or a cross-entropy loss function.

23. A method comprising: receiving, from a user device, a communication to perform an action; determining, based on a data sample and via a first machine learning model, that the communication should not be authorized; based on determining that the communication should not be authorized, obtaining a user preference indicative of a first feature of the data sample that the user prefers changing over a set of other features of the data sample; in response to obtaining the user preferences, applying a adjustment parameter to one or more features of the set of other features of the data sample; and generating, based on the adjustment parameter, a counterfactual sample comprising a modification of the first feature of the data sample.

24. The method of the preceding embodiment, wherein obtaining the user preference comprises: generating text that prompts the user to indicate which of the first feature or a second feature of the data sample the user prefers changing; sending the text to a user device; and in response to sending the text, obtaining the user preference indicative of the first feature of the data sample.

25. The method of any of the preceding embodiments, wherein obtaining the user preference comprises: generating a list of features of the data sample; sending the list of features to a user device; and in response to sending the list of features to the user device, receiving a ranked ordering of features that indicates a preference for changing the first feature over the set of other features of the data sample.

26. The method of any of the preceding embodiments, wherein applying an adjustment parameter to one or more features of the set of other features comprises: determining a second feature of the one or more features that cannot be changed by actions taken by the user; and based on the second feature being unchangeable by the user, applying an adjustment parameter to the second feature.

27. The method of any of the preceding embodiments, wherein applying an adjustment parameter to the one or more features of the set of other features comprises: determining that the user preference satisfies a threshold preference level; based on the user preference satisfying the threshold preference level, selecting a first adjustment parameter from a set of penalties; and applying the first adjustment parameter to the one or more features of the set of other features.

28. The method of any of the preceding embodiments, wherein applying an adjustment parameter to the one or more features of the set of other features comprises: determining a first proportional adjustment parameter that is proportional to the user preference; determining a second proportional adjustment parameter; applying the first proportional adjustment parameter to a first subset of the set of other features; and applying the second proportional adjustment parameter to a second subset of the set of other features.

29. The method of any of the preceding embodiments, wherein applying an adjustment parameter to the one or more features of the set of other features comprises: determining, based on the user preference, a parameter for an objective function used by a second machine learning model, wherein the parameter causes the machine learning model to generate counterfactual samples by adjusting the first feature; and training the second machine learning model using the objective function.

30. The method of any of the preceding embodiments, wherein the first machine learning model and the second machine learning model are the same machine learning model.

31. The method of any of the preceding embodiments, further comprising: assigning, via a clustering model, the counterfactual sample to a first cluster of a set of clusters, wherein each cluster of the set of clusters comprises a plurality of counterfactual samples, and wherein each cluster of the set of clusters is mapped to one content item of a plurality of content items; based on assigning the counterfactual sample to the first cluster, obtaining a first content item of a plurality of content items, wherein the first content item corresponds to the first cluster, and wherein the first content item indicates one or more changes the user can make to facilitate acceptance of the communication to perform the action; and sending the first content item to the user device.

32. The method of any of the preceding embodiments, further comprising: based on generating the counterfactual sample, training a second machine learning model by alternating between a first training and a second training, the first training comprising: training, using a first loss function and a first portion of training data, a second machine learning model, wherein the first loss function compares a first predicted probability of the second machine learning model with a first class label of the first portion of training data; and the second training comprising: training, using a second loss function and a second portion of training data, the second machine learning model, wherein the second loss function minimizes a difference between a second predicted probability and a threshold for accepting the communication, and wherein the second portion of training data comprises the counterfactual sample.

33. A tangible, non-transitory, machine-readable medium storing instructions that, when executed by a data processing apparatus, cause the data processing apparatus to perform operations comprising those of any of embodiments 1-32.

34. A system comprising one or more processors; and memory storing instructions that, when executed by the processors, cause the processors to effectuate operations comprising those of any of embodiments 1-32.

35. A system comprising means for performing any of embodiments 1-32.

What is claimed is:

1. A system for training a machine learning model to minimize generation of new output that conflicts with previous output generated by a previous machine learning model, the system comprising:

one or more processors and non-transitory media having instructions recorded thereon that, when executed by the one or more processors, cause operations comprising:

based on a first output, from a first machine learning model, indicating a communication corresponding to a first data sample should not be accepted, executing a counterfactual sample generation system to generate a first counterfactual sample comprising a modification for the first data sample, wherein the modification causes the first machine learning model to generate output indicating that the communication should be accepted;

configuring (i) a first training of a second machine learning model to use a first loss function that compares a first predicted probability of the second machine learning model with a first class label of first training data and (ii) a second training of the second machine learning model to use a second loss function that minimizes a difference between a second predicted probability of the second machine learning model and a threshold for accepting the communication;

after the first machine learning model outputs the first output indicating that the communication should not be accepted, and based on the configuration, executing the second machine learning model and alternating between the first training of the second machine learning model with the first loss function on the first training data and the second training of the second machine learning model with the second loss function on second training data comprising the first counterfactual sample; and in connection with obtaining a second communication after completion of the first training and the second training, inputting data corresponding to the second communication to the second machine learning model to obtain a second output, from the second machine learning model, indicating that the second communication should be accepted.

2. The system of claim 1, wherein alternating between the first training and the second training comprises, after the first machine learning model outputs the first output indicating that the communication should not be accepted, alternating between the first training of the second machine learning model with the first loss function on the first training data comprising one or more other counterfactual samples and the second training of the second machine learning model with the second loss function on the second training data comprising the first counterfactual sample.

3. The system of claim 1, the operations further comprising:

in connection with the first training and the second training of the second machine learning model respectively with the first loss function and the second loss function, displaying, on a user interface, a first loss value corresponding to the first loss function, a second loss value corresponding to the second loss function, and a plurality of counterfactual samples.

4. The system of claim 1, wherein the first training data corresponds to a first set of users and the second training data corresponds to a second set of users that do not overlap with the first set of users.

5. A method comprising:

performing, via one or more processors, operations comprising:

based on a first output, from a first machine learning model, indicating a communication corresponding to a first data sample should not be accepted, executing a counterfactual sample generation system to generate a first counterfactual sample comprising a modification for the first data sample, wherein the modification causes the first machine learning model to generate output indicating that the communication should be accepted;

after the first machine learning model outputs the first output indicating that the communication should not be accepted, executing a second machine learning model and alternating between a first training of the second machine learning model with a first loss function on first training data and a second training of the second machine learning model with a second loss function on second training data comprising the first counterfactual sample, wherein the first loss function compares a first predicted probability of the second machine learning model with a first class label of the first training data, and wherein the second loss function minimizes a difference between a second predicted probability of the second machine learning model and a threshold for accepting the communication; and in connection with obtaining a second communication after completion of the first training and the second training, inputting data corresponding to the second communication to the second machine learning model to obtain a second output, from the second machine learning model, indicating that the second communication should be accepted.

6. The method of claim 5, wherein alternating between the first training and the second training comprises, after the first machine learning model outputs the first output indicating that the communication should not be accepted, alternating between the first training of the second machine learning model with the first loss function on the first training data comprising one or more other counterfactual samples and the second training of the second machine learning model with the second loss function on the second training data comprising the first counterfactual sample.

7. The method of claim 5, wherein alternating between the first training and the second training comprises, after the first machine learning model outputs the first output indicating that the communication should not be accepted, alternating between the first training of the second machine learning model with a binary cross-entropy function on the first training data and the second training of the second machine learning model with the second loss function on the second training data comprising the first counterfactual sample.

8. The method of claim 5, wherein alternating between the first training and the second training comprises, after the first machine learning model outputs the first output indicating that the communication should not be accepted, alternating between the first training of the second machine learning model with a cross-entropy loss function on the first training data and the second training of the second machine learning model with the second loss function on the second training data comprising the first counterfactual sample.

9. The method of claim 5, further comprising:

in connection with the first training and the second training of the second machine learning model respectively with the first loss function and the second loss function, displaying, on a user interface, a first loss value corresponding to the first loss function, a second loss value corresponding to the second loss function, and a plurality of counterfactual samples.

10. The method of claim 5, wherein:

executing the counterfactual sample generation system comprises executing the counterfactual sample generation system to generate a plurality of counterfactual samples for a plurality of data samples corresponding to communications that were not accepted; and the second training data comprises the plurality of counterfactual samples.

11. The method of claim 5, wherein the first training data corresponds to a first set of users, and the second training data corresponds to a second set of users that do not overlap with the first set of users.

12. One or more non-transitory computer-readable media comprising instructions that, when executed by one or more processors, causes operations comprising:

based on a first output, from a first machine learning model, indicating a communication corresponding to a first data sample should not be accepted, executing a counterfactual sample generation system to generate a first counterfactual sample comprising a modification for the first data sample, wherein the modification causes the first machine learning model to generate output indicating that the communication should be accepted;

executing a second machine learning model and alternating between a first training of the second machine learning model with a first loss function on first training data and a second training of the second machine learning model with a second loss function on second training data comprising the first counterfactual sample, wherein the first loss function compares a first predicted probability of the second machine learning model with a first class label of the first training data, and wherein the second loss function minimizes a difference between a second predicted probability of the second machine learning model and a threshold for accepting the communication; and in connection with obtaining a second communication after completion of the first training and the second training, inputting data corresponding to the second communication to the second machine learning model to obtain a second output, from the second machine learning model, indicating that the second communication should be accepted.

13. The one or more non-transitory computer-readable media of claim 12, wherein alternating between the first training and the second training comprises, after the first machine learning model outputs the first output indicating that the communication should not be accepted, alternating between the first training of the second machine learning model with the first loss function on the first training data and the second training of the second machine learning model with the second loss function on the second training data.

14. The one or more non-transitory computer-readable media of claim 12, wherein alternating between the first training and the second training comprises, after the first machine learning model outputs the first output indicating that the communication should not be accepted, alternating between the first training of the second machine learning model with the first loss function on the first training data comprising one or more other counterfactual samples and the second training of the second machine learning model with the second loss function on the second training data comprising the first counterfactual sample.

15. The one or more non-transitory computer-readable media of claim 12, wherein alternating between the first training and the second training comprises, after the first machine learning model outputs the first output indicating that the communication should not be accepted, alternating between the first training of the second machine learning model with a binary cross-entropy function on the first training data and the second training of the second machine learning model with the second loss function on the second training data comprising the first counterfactual sample.

16. The one or more non-transitory computer-readable media of claim 12, wherein alternating between the first training and the second training comprises, after the first machine learning model outputs the first output indicating that the communication should not be accepted, alternating between the first training of the second machine learning model with a cross-entropy loss function on the first training data and the second training of the second machine learning model with the second loss function on the second training data comprising the first counterfactual sample.

17. The one or more non-transitory computer-readable media of claim 12, the operations further comprising:

in connection with the first training and the second training of the second machine learning model respectively with the first loss function and the second loss function, displaying, on a user interface, a first loss value corresponding to the first loss function, a second loss value corresponding to the second loss function, and a plurality of counterfactual samples.

18. The one or more non-transitory computer-readable media of claim 12, wherein:

executing the counterfactual sample generation system comprises executing the counterfactual sample generation system to generate a plurality of counterfactual samples for a plurality of data samples corresponding to communications that were not accepted; and the second training data comprises the plurality of counterfactual samples.

19. The one or more non-transitory computer-readable media of claim 12, wherein the first training data corresponds to a first set of users, and the second training data corresponds to a second set of users that do not overlap with the first set of users.

\* \* \* \* \*